US010401051B2

(12) United States Patent
Chopra

(10) Patent No.: US 10,401,051 B2
(45) Date of Patent: Sep. 3, 2019

(54) FAIL-SAFE ACTUATING SYSTEM

(76) Inventor: Amrish Chopra, Faridabad (IN)

(*) Notice: Subject to any disclaimer, the term of this patent is extended or adjusted under 35 U.S.C. 154(b) by 1040 days.

(21) Appl. No.: 14/384,397

(22) PCT Filed: Sep. 14, 2012

(86) PCT No.: PCT/IN2012/000616
§ 371 (c)(1),
(2), (4) Date: Sep. 11, 2014

(87) PCT Pub. No.: WO2014/009965
PCT Pub. Date: Jan. 16, 2014

(65) Prior Publication Data
US 2015/0111489 A1    Apr. 23, 2015

(30) Foreign Application Priority Data

Jul. 9, 2012 (IN) .......................... 2127/DEL/2012

(51) Int. Cl.
| F24F 13/10 | (2006.01) |
| F24F 13/14 | (2006.01) |
| F16K 31/00 | (2006.01) |
| F24F 11/00 | (2018.01) |
| F24F 11/33 | (2018.01) |

(52) U.S. Cl.
CPC ............ *F24F 13/10* (2013.01); *F16K 31/003* (2013.01); *F24F 11/0001* (2013.01); *F24F 13/1426* (2013.01); *F24F 11/33* (2018.01)

(58) Field of Classification Search
CPC ...................................................... F24F 13/14
USPC ........................................................ 454/333
See application file for complete search history.

(56) References Cited

U.S. PATENT DOCUMENTS

| 3,028,726 A | 4/1962 | Jenkins et al. |
| 4,038,706 A * | 8/1977 | Ober ........................ A61F 2/582 |
| | | 623/60 |
| 4,289,038 A | 9/1981 | Hore |
| 4,334,570 A * | 6/1982 | Adams ...................... A62C 2/16 |
| | | 160/1 |

(Continued)

FOREIGN PATENT DOCUMENTS

| DE | 19705950 | 9/1998 |
| WO | WO-2014009965 | 1/2014 |

OTHER PUBLICATIONS

"International Application No. PCT/IN2012/000616, International Search Report dated Apr. 25, 2013", (Apr. 25, 2013), 3 pgs.

*Primary Examiner* — Steven B McAllister
*Assistant Examiner* — Samantha A Probst
(74) *Attorney, Agent, or Firm* — Schwegman Lundberg & Woessner, P.A.

(57) ABSTRACT

Described is a fail-safe actuating system, comprising an actuator with an actuator housing and an output element. The output element is couplable to a controlled device. The fail-safe actuating system also comprises a biasing element, coupled to the actuator housing, which gets biased by a movement of the actuator housing in a first predefined direction; a locking device that locks the actuator housing for holding the biasing element in a biased state; and a controller configured to operate the actuator in a first operating mode, in which the actuator housing moves with respect to the output element for biasing the biasing element, and in the second operating mode, in which the output element moves with respect to the actuator housing for moving the controlled device.

20 Claims, 7 Drawing Sheets

(56) References Cited

U.S. PATENT DOCUMENTS

| | | | | |
|---|---|---|---|---|
| 4,338,967 | A * | 7/1982 | McCabe | A62C 2/14 137/601.09 |
| 4,525,001 | A | 6/1985 | Lumsden et al. | |
| RE32,362 | E * | 2/1987 | McCabe | A62C 2/14 137/15.25 |
| 4,741,508 | A | 5/1988 | Fukamachi | |
| 5,182,498 | A | 1/1993 | Stuhr | |
| 5,217,407 | A * | 6/1993 | Bailey | A62C 2/16 454/257 |
| 5,364,129 | A * | 11/1994 | Collins | B60R 22/1952 180/268 |
| 5,367,997 | A | 11/1994 | Kawamura et al. | |
| 5,501,425 | A * | 3/1996 | Reinicke | F16K 31/003 251/129.01 |
| 5,749,556 | A * | 5/1998 | Matsuoka | F16M 11/08 248/349.1 |
| 5,887,849 | A | 3/1999 | Holmes, Jr. et al. | |
| 5,988,319 | A | 11/1999 | Hudson et al. | |
| 6,015,142 | A | 1/2000 | Ulicny et al. | |
| 6,237,630 | B1 * | 5/2001 | Stone | F16K 17/383 137/601.12 |
| 6,431,317 | B1 | 8/2002 | Coe | |
| 6,447,393 | B1 | 9/2002 | McCabe | |
| 6,496,101 | B1 * | 12/2002 | Stillwagon | E05B 5/003 340/5.61 |
| 6,511,107 | B2 * | 1/2003 | Barczynski | E05B 77/26 292/216 |
| 6,516,640 | B2 * | 2/2003 | Jacobs | B60R 25/02128 70/186 |
| 7,111,597 | B2 * | 9/2006 | Manole | F01L 1/143 123/90.16 |
| 7,228,945 | B2 * | 6/2007 | O'Neill | B60T 8/325 188/71.5 |
| 7,293,308 | B2 * | 11/2007 | Everett | A61B 5/0555 378/20 |
| 7,357,435 | B2 * | 4/2008 | Robertson | B60R 25/1001 296/146.4 |
| 7,374,008 | B1 * | 5/2008 | Neal | B60R 21/38 180/274 |
| 7,398,786 | B2 * | 7/2008 | Eichhorn | A45D 27/46 134/105 |
| 7,478,845 | B2 * | 1/2009 | Mankame | E05B 47/0009 292/201 |
| 7,837,585 | B2 * | 11/2010 | Pinkos | B60K 17/16 475/150 |
| 7,909,404 | B2 * | 3/2011 | Spangler, Jr. | B60N 2/38 297/344.12 |
| 8,177,268 | B2 * | 5/2012 | Varney | E05B 13/00 292/297 |
| 8,241,047 | B2 * | 8/2012 | Ni | G06K 19/07732 439/131 |
| 8,328,180 | B2 * | 12/2012 | Kwak | B65H 3/0669 271/10.13 |
| 8,348,526 | B2 * | 1/2013 | Shintani | G03B 9/14 396/357 |
| 8,397,546 | B2 * | 3/2013 | Varney | E05B 47/004 292/194 |
| 8,418,391 | B2 * | 4/2013 | Kemmerer | F41A 17/066 42/70.05 |
| 8,516,863 | B2 * | 8/2013 | Miller | E05B 9/00 292/142 |
| 8,550,505 | B2 * | 10/2013 | Nuss | B60N 2/4606 292/1 |
| 8,635,893 | B2 * | 1/2014 | Miller | E05B 49/00 70/283 |
| 8,640,783 | B2 * | 2/2014 | Dahlgren | A62C 35/68 169/29 |
| 8,727,180 | B2 * | 5/2014 | Zonana | B65D 83/0409 221/195 |
| 8,727,419 | B2 * | 5/2014 | Syvret | B60J 1/17 296/146.2 |
| 8,840,495 | B2 * | 9/2014 | Comsa | F01L 1/02 474/110 |
| 9,108,540 | B2 * | 8/2015 | Bonk | B60N 2/0232 |
| 9,664,409 | B2 * | 5/2017 | Marak | F24F 11/72 |
| 9,707,831 | B2 * | 7/2017 | Heirtzler | B60J 5/0468 |
| 2001/0027814 | A1 * | 10/2001 | Stone | F16K 17/383 137/601.12 |
| 2003/0178257 | A1 * | 9/2003 | Oh | F16K 1/223 185/40 R |
| 2004/0023754 | A1 * | 2/2004 | Flugrad, Jr. | F16H 13/02 476/50 |
| 2004/0209566 | A1 | 10/2004 | Caliendo et al. | |
| 2004/0224627 | A1 * | 11/2004 | Becelaere | F24F 11/0001 454/257 |
| 2010/0007301 | A1 | 1/2010 | Ochsenbein et al. | |
| 2010/0056039 | A1 | 3/2010 | Weber et al. | |
| 2010/0194326 | A1 * | 8/2010 | Carlson | G05B 19/19 318/558 |
| 2014/0346381 | A1 * | 11/2014 | Conn | F16K 31/56 251/129.15 |
| 2016/0177843 | A1 * | 6/2016 | Molavi | F02M 35/10255 251/68 |

\* cited by examiner

FAIL-SAFE ACTUATING SYSTEM

PRIORITY CLAIM TO RELATED APPLICATIONS

This application is a U.S. national stage application filed under 35 U.S.C. § 371 from International Application Serial No. PCT/IN2012/000616, which was filed Sep. 14, 2012, and published as WO 2014/009965 on Jan. 16, 2014, and which claims priority to Indian Application No. 2127/DEL/2012, filed Jul. 9, 2012, which applications and publication are incorporated by reference as if reproduced herein and made a part hereof in their entirety, and the benefit of priority of each of which is claimed herein.

TECHNICAL FIELD

The present subject matter relates to actuating systems and, particularly but not exclusively, to fail-safe actuating systems.

BACKGROUND

Systems, including Heating, Ventilating and Air-Conditioning (HVAC) systems, are implemented with one or more controlled devices that are operated for controlling and regulating the flow or movement of fluids, such as air, gases or liquids, within the system. The controlled devices include valves and dampers, which are operated using one or more actuating devices. Typically, an actuating device, simply referred as an actuator, includes a prime mover, such as a motor, which is operated to open and/or close one or more valves or dampers. The degree of opening or closing of the valves or dampers is controlled for the regulation of fluid flow within the system.

In some systems, in case of an emergency, such as fire, smoke, frosting, leakage, or an undesirable power failure, it may be required that the one or more controlled devices in the system are moved to a predefined safe position. The predefined safe position may be an open position or a closed position of the controlled device, which may be necessary to attain for the safety of the system in the emergency or power failure situations. Such a predefined safe position of the controlled device is typically referred to as a fail-safe position.

For moving the controlled device to a fail-safe position, the system is implemented with a fail-safe operation. The fail-safe operation may be achieved through a fail-safe actuating system. The fail-safe actuating system may either be integrated with the actuating device operating the controlled device, or be provided as a separate actuating system. The fail-safe operation or fail-safe actuating system is an essential aspect in systems involving flow or movement of fluids and, thus, it is important to have a simple, cost-effective and efficient fail-safe operation or fail-safe actuating system in such systems.

SUMMARY

This summary is provided to introduce concepts related to a fail-safe actuating system. This summary is neither intended to identify essential features of the claimed subject matter nor is it intended for use in determining or limiting the scope of the claimed subject matter.

In accordance with an embodiment of the present subject matter, a fail-safe actuating system is described. The fail-safe actuating system includes an actuator with an actuator housing and an output element. The output element is couplable to a controlled device to move the controlled device in conjunction with the output element. The fail-safe actuating system also includes a biasing element and a locking device. The biasing element is coupled to the actuator housing, such that the biasing element is biased by a movement of the actuator housing in a first predefined direction. The locking device locks the actuator housing for holding the biasing element in a biased state. The fail-safe actuating system further includes a controller configured to operate the actuator in a first operating mode and in a second operating mode. In the first operating mode, the output element is stationary and the actuator housing moves with respect to the output element and in the first predefined direction for biasing the biasing element. In the second operating mode, the actuator housing is stationary and the output element moves with respect to the actuator housing for moving the controlled device.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

DETAILED DESCRIPTION

Figure 1:
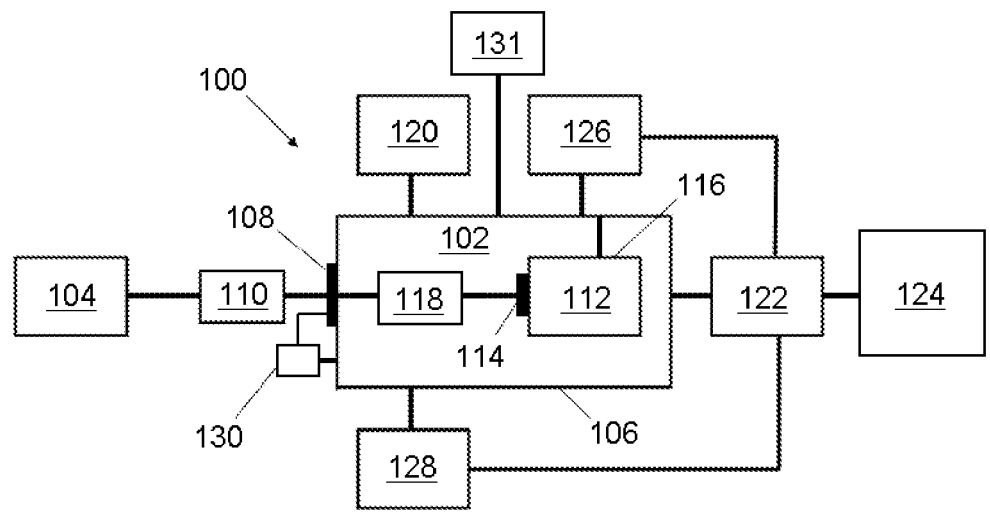
FIG. 1 illustrates a block diagram of a fail-safe actuating system, according to an embodiment of the present subject matter.

The present subject matter relates to fail-safe actuating systems. The fail-safe actuating system of the present subject matter can be implemented in a variety of systems, in which one or more controlled devices are to be actuated between open and closed positions and the one or more controlled devices are to be moved to a predefined fail-safe position. The controlled devices, for example, include dampers and valves, which may be used and operated in systems for control and regulation of flow of air, gases and liquids. With the fail-safe actuating system of the present subject matter, in case of a power failure or any emergency, the one or more controlled devices can be moved to a predefined fail-safe position in a substantially easy and efficient manner.

A conventional fail-safe actuating system includes an actuator for the actuation of one or more controlled devices. The controlled device is coupled to an output shaft, or an output element, of the actuator, such that the controlled device is moved in conjunction with the movements of the output shaft. The fail-safe actuating system is provided with an energy storing means, such as a spring, which facilitates in moving the controlled device to a fail-safe position in case of a power failure or an emergency. The movement of the controlled device to a fail-safe position may be understood as a fail-safe operation of the fail-safe actuating system. In conventional fail-safe actuating systems, the spring is coupled to the output shaft of the actuator. Conventionally, the spring is biased or wound by the movement of the output shaft when the actuator operates the output shaft for positioning the controlled device. Thus, in conventional fail-safe actuating systems, the actuator has to simultaneously overcome the resistance offered by both, the controlled device and the spring. Further, at the time of power failure or any emergency, the biased spring moves the output shaft back, which moves the controlled device to a fail-safe position. Conventionally, the actuator includes a motor (a prime mover) that offers a detent torque due to a residual electromagnetism between the rotor and the stator of the motor, in the absence of power. During the fail-safe operation, in the absence of power, this detent torque has to be overcome to move the output shaft coupled to the rotor, for moving the controlled device to a fail-safe position. Thus, the spring used in the conventional fail-safe actuating system has to be substantially strong to overcome the resistance offered by the controlled device and the detent torque of the motor, during the fail-safe operation. Also, with the usage of such a strong spring, a substantially powerful actuator is used for biasing the spring.

Further, the actuator used in a conventional fail-safe actuating system, may include a high speed and low torque motor. Such a motor, particularly the shaft of the motor, typically, is coupled to a speed reducing unit, such as a gear train, which makes the output of the motor as a low speed and high torque output. The gear train, typically, includes a plurality of gears that are cogged together. The gear train facilitates in low speed operation of the output shaft of the actuator for the purpose of controlled actuation of controlled devices. In a conventional fail-safe actuating system, the spring, for the fail-safe operation, may also have to move the gear train in the reverse direction along with the reverse movement of the output shaft. Thus, conventionally, the spring used has to be substantially strong considering the torque offered by the gear train along with the detent torque offered by the motor and the resistance offered by the controlled device.

The strong springs and powerful actuators are costly. Thus, the usage of substantially strong springs and substantially powerful actuators in the conventional fail-safe actuating systems, as described above, make the conventional fail-safe actuating systems expensive. Furthermore, strong springs and powerful actuators are substantially large in size which makes the conventional fail-safe actuating systems bulky.

Further, in conventional fail-safe actuating systems, since the spring is coupled to the output shaft, the actuator has to work against the spring for the actuation of controlled device. Thus, an excessive energy or power is utilized for the actuation and an excessive wear and tear is resulted in the conventional fail-safe actuating systems, which make the conventional fail-safe actuating systems inefficient.

Furthermore, it may be required that the controlled device is moved to a fail-safe position in quick time. Since a quick reversal in the movement of the output shaft along with the gear train can damage the gear train and the actuator, in some conventional fail-safe actuating systems, a brake assembly is coupled to the output shaft and/or the controlled device for controlling the speed of movement of the output shaft, the gear train and the controlled device. However, the conventional fail-safe actuating systems use complicated brake assemblies, which increases the cost of the conventional fail-safe actuating system and makes the arrangement of the conventional fail-safe actuating systems complex. Also, conventionally, as the braking assembly is coupled either to the output element or to the controlled device, the braking assembly may also be in operation and offer resistance during the positioning of the controlled device. With this, the actuator may also have to work against the braking assembly, which may cause excessive power consumption and excessive wear and tear in the conventional fail-safe actuating systems.

Further, in some conventional fail-safe actuating systems, a clutch assembly is used for disengaging or de-coupling the output shaft of the actuator from the controlled device during the fail-safe operation to avoid the detent torque of the actuator, which otherwise has to be overcome by the spring. Further, a clutch assembly is also used in some conventional fail-safe actuating systems for disengaging the gear train from the output shaft of the actuator to avoid the torque due to the gear train during the fail-safe operation, which otherwise has to be overcome by the spring. However, the usage of such clutch assemblies increases the cost of the fail-safe actuating system and makes the arrangement of the fail-safe actuating system complex.

Thus, the conventional fail-safe actuating systems, including the ones described above, require a substantially strong spring and a substantially powerful actuator for overcoming substantially higher resistances and detent torque offered in the system; have a complex arrangement; have high power consumption; have high wear and tear; and/or are bulky and expensive.

The present subject matter describes fail-safe actuating systems which are simple in configuration, efficient in operation, less bulky and less expensive, in comparison to the conventional fail-safe actuating systems. These and other aspects of the fail-safe actuating systems of the present subject matter are apparent from features of the fail-safe actuating system as described in the description of FIG. 1.

It should be appreciated by those skilled in the art that any block diagrams herein represent conceptual views of illustrative systems embodying the principles of the present subject matter.

The fail-safe actuating system of the present subject matter can be implemented in a variety of systems, including Heating, Ventilating and Air-Conditioning (HVAC) systems, positioning systems and signaling systems, in which one or more controlled devices are to be positioned between open and closed positions, and are to be moved to a fail-safe position is case of a failure of power supply (or energy supply) or an emergency. The predefined fail-safe position may be, depending on the requirement, such as a fully closed position or a fully open position of the controlled device. For the purposes of the present subject matter, an emergency may be understood as an undesirable or unwanted situation, such as fire, smoke, leakage, frosting, and an accident, in which the controlled device is to be moved to a fail-safe position. In such an emergency situation, the power supply (or the energy supply) to the fail-safe actuating system is cut-off.

FIG. 1 illustrates a block diagram of a fail-safe actuating system 100, according to an embodiment of the present subject matter. The fail-safe actuating system 100 includes an actuator 102 that is capable of actuating or operating a controlled device 104. The controlled device 104 may include, but not restricted to, a valve, a damper, a signaling arm, a robotic arm, or an assembly of such devices, depending on the system in which the fail-safe actuating system 100 is implemented. In an implementation, the actuator 102 may be an electrical actuator, a pneumatic actuator, or a hydraulic actuator. The actuator 102 has an actuator housing 106 and an output element 108. The actuator housing 106 may be a cover or a body of the actuator 102. The output element 108 may be understood as a driving element through which the controlled device 104 is actuated or operated. The output element 108 is couplable to the controlled device 104.

In an implementation, the output element 108 may either be directly coupled, or coupled through a coupler unit 110, to the controlled device 104 such that the controlled device 104 is moved in conjunction with the output element 108. The coupler unit 110 depends on the type of output element 108 of the actuator 102 and the type of controlled device 104 to be operated. The coupler unit 110 may include a clamp, one or more gears, or a combination thereof.

The actuator 102 includes a prime mover 112 that converts one form of energy to another to provide, a motive force. An output 114 of the prime mover 112 is coupled to the output element 108, such that the motive force of the prime mover 112 drives the output element 108. The prime mover 112 has a housing 116 that is fixedly coupled to the actuator housing 106. For example, in case of an electrical actuator 102, the prime mover 112 may be an electrical motor, with the output 114 being a motor shaft and the housing 116 being a motor housing.

Further, in an implementation, in the actuator 102, the output 114 of the prime mover 112 may be coupled to the output element 108 through a speed reducing unit 118. The speed reducing unit 118 may be a gear train or a gear arrangement that is used for reducing the speed and increasing the torque at the output element 108 of the actuator 102.

The fail-safe actuating system 100 also includes a biasing element 120 coupled to the actuator housing 106. The biasing element 120 may be an energy storing means, which when biased deforms mechanically to store energy therein, and when unbiased regains it's original shape and release the stored energy. The biasing element 120 may be of a predefined strength sufficient to move back the actuator 102 during a fail-safe operation in the fail-safe actuating system 100. In an implementation, the biasing element 120 may be a spring, for example, a coil spring, a torsion spring, an expansion spring, a compression spring or a gas spring. In another implementation, the biasing element 120 may be an elastic element. The biasing element 120 is coupled to the actuator housing 106 such that the biasing element 120 is biased by the movement of the actuator housing 106 in a first predefined direction. The actuator housing 106 is moved in a second predefined direction, opposite to the first predefined direction, upon un-biasing of the biasing element 120. The directions of movement of the actuator housing 106 may be a rotation direction or an axial (linear) direction.

Further, the fail-safe actuating system 100 includes a controller 122 through which the actuator 102, particularly the prime mover 112, is coupled to a power supply 124. The power supply 124 may be understood as a source that provides power (or energy) to the actuator 102, particularly the prime mover 112, for its operation. In an implementation, the controller 122 is configured to operate the actuator 102 in two operating modes, namely a first operating mode and a second operating mode. In the first operating mode, the output element 108 is stationary, and the actuator housing 106 is moved in the first predefined direction, with respect to the output element 108, for biasing the biasing element 120. In the second operating mode, the actuator housing 106 is stationary, and the output element 108 is moved with respect to the actuator housing 106 for moving or positioning the controlled device 104. In an implementation, the controller 122 is also configured to cut-off the supply of power (or energy) from the power supply 124 to the actuator 102 in case of an emergency. The operations of the controller 122 and the actuator 102 are described in detail later in the description. Although, in FIG. 1, the controller 122 is shown to reside outside the actuator 102 and coupled to the actuator 102 for its operation; in an implementation, the controller 122 can be a part of the actuator 102 and can reside inside the actuator housing 106.

The fail-safe actuating system 100 also includes a locking device 126 that couples with the actuator housing 106 to lock the actuator housing 106 for holding the biasing element 120 in a biased state. The biased state of the biasing element 120 is defined as a state in which the biasing element is mechanically deformed in shape and stores energy therein. The locking device 126 may be a mechanical locking device, an electromagnetic locking device, a hydraulic locking device or a pneumatic locking device.

In an implementation, the locking device 126 is powered by the power supply 124. In said implementation, the locking device 126 attains an ON-state in an active state of the power supply 124 and attains an OFF-state in a cut-off state of the power supply 124. The active state of the power supply 124 is a state in which power (or energy) is being provided from the power supply 124 to the fail-safe actuating system 100. The cut-off state of the power supply 124 is a state in which power (or energy) is not being provided from the power supply 124 to the fail-safe actuating system 100. In the ON state, the locking device 126 is configured to lock the actuator housing 106 at a predefined position. In the OFF-state, the locking device 126 is configured to unlock the actuator housing 106 from its predefined position. The locking and the unlocking of the actuator housing 106 by the locking device 126 are described later in the description.

In an implementation, as shown in FIG. 1, the locking device 126 may be coupled to the power supply 124 through the controller 122. In the active state of the power supply 124, the controller 122 sets the locking device 126 in the ON-state for locking the actuator housing 106 in the predefined position. In the cut-off state of the power supply 124, which could be either due to a failure of power supply 124 or due to a cut-off of power supply 124 by the controller 122 in an emergency, the controller 122 sets the locking device 126 in the OFF-state for unlocking the actuator housing 106 from the predefined position.

The description below describes the operation of the fail-safe actuating system 100 and its components. With the power supply 124 in the active state, at first, the actuator 102 is operated in the first operating mode by the controller 122. As mentioned earlier, in the first operating mode, the output element 108 is stationary, and the actuator housing 106 is moved in the first predefined direction, with respect to the output element 108. This movement of the actuator housing 106 biases the biasing element 120.

In an implementation, the actuator housing 106 may be moved in the first predefined direction from a first predefined position to a second predefined position in the first operating mode. The first predefined position of the actuator housing 106 may be defined as a position at which the biasing element 120 is substantially unbiased, and the second predefined position of the actuator housing 106 may be defined as a position at which the biasing element 120 is substantially biased.

After biasing the biasing element 120, the actuator housing 106 is locked at the second predefined position, by the locking device 126. In this state of the actuator housing 106, which may also be referred as a locked state, the biasing element 120 is held in the biased state.

Upon biasing the biasing element 120 and locking the actuator housing 106, the operation of the actuator 102 is switched by the controller 122 to the second operating mode. In an implementation, the fail-safe actuating system 100 includes a limit switch 128, which is coupled to the controller 122 to indicate the controller 122 for switching the operation of the actuator 102 from the first operating mode to the second operating mode. In an implementation, the limit switch 128 may configured to mechanically, electrically, magnetically, optically or inductively couple with the actuator housing 106 at the second predefined position, at which the actuator housing 106 is locked. Upon its coupling with the actuator housing 106, the limit switch 128 indicates the controller 122 for switching the operation of the actuator 102.

As mentioned earlier, in the second operating mode, the actuator housing 106 is stationary, and the output element 108 is moved with respect to the actuator housing 106. The movement of the output element 108 moves the controlled device 104 coupled to the output element 108. In an implementation, the actuator 102 may be operated to move the output element 108 in either direction for regulating the degree of opening and closing of the controlled device 104.

The description below describes the fail-safe operation of the fail-safe actuating system 100 and its components. In case of a failure of power supply 124 or any emergency in which the supply from the power supply 124 to the fail-safe actuating system 100 is cut-off by the controller 122, the locking device 126 is switched from its ON-state to its OFF-state. As mentioned earlier, in the OFF-state, the locking device 126 is released to unlock the actuator housing 106 from the locked state. The unlocking of the actuator housing 106 allows the biasing element 120 to unbias or release, which forces the actuator housing 106 to move in the second predefined direction, opposite to the first predefined direction of movement in the first operating mode. Now, the fail-safe actuating system 100 is configured such that, during the movement of the actuator housing 106 in the second predefined direction, the output element 108 and the coupler unit 110 are moved together with the actuator housing 106. With this movement of the output element 108 and the coupler unit 110, the controlled device 104 is moved to a fail-safe position. As mentioned earlier, the fail-safe position may be a fully closed position or a fully open position of the controlled device 104, depending on the requirement. The fail-safe actuating system 100 can be configured to move the controlled device 104 to any one of the fail-safe positions in case of a power failure or any emergency.

In an implementation, the fail-safe actuating system 100 includes an engaging unit 130 which engages the actuator housing 106 with the output element 108 during the movement of the actuator housing 106 in the second predefined direction. This engagement facilitates in moving the output element 108 together with the actuator housing 106, which in-turn enables the movement of the controlled device 104 to the fail-safe position.

In an implementation, the actuator 102, and particularly the prime mover 112, may have a detent torque in the absence of power to the actuator 102. This detent torque in the prime mover 112 may not allow the output 114 of the prime mover 112 to move relative to the housing 116 of the prime mover 112, which may in-turn allow the output element 108 to move together with the actuator housing 106, during the fail-safe operation, for moving the controlled device 104 to the fail-safe position.

Further, in an implementation, the speed reducing unit 118 may be a non-reversible type speed reducing unit, in which the power or motion is transferred from a driver element (i.e., the prime mover 112) to a driven element (i.e. the output element 108) and not the other way round. This type of speed reducing unit 118 may force the output element 108 to move together with the actuator housing 106 during fail-safe operation, for moving the controlled device 104 to the fail-safe position. In an implementation, the non-reversible type of the speed reducing unit 118 may include a worm-screw arrangement, a nut-screw arrangement, or any other type of conventional non-reversible arrangement.

In an implementation, the fail-safe actuating system 100 may include a braking unit 131 that controls the speed of movement of the actuator housing 106 and the output element 108, and hence the speed of movement of the controlled device 104, during the fail-safe operation. It may be required to move the controlled device 104 to the fail-safe position is a quick time. During the fail-safe operation, the actuator housing 106, and hence the output element 108, the coupler unit 110 and the controlled device 104, may pick up speed and may come to a stop with a substantially high force or impact. The braking unit 131 facilitates in preventing any damage to the actuator 102 and/or the controlled device 104, which may otherwise be caused due to their stopping with a high force or impact.

In an implementation, the braking unit 131 is coupled to the actuator 102, and particularly coupled to the actuator housing 106. Further, in an implementation, the braking unit 131 may be an air-based braking unit that is configured such that, during the fail-safe operation, the braking unit 131 offers a substantially low (minimum) resistance at the start of the fail-safe operation, offers an increasing resistance until the end of the fail-safe operation, and offers no resistance at the end of the fail-safe operation. The construct and the functioning of the braking unit 131 are described later, with reference to FIG. 8.

The fail-safe actuating system 100 of the present subject matter is simple in configuration, is efficient in operation, and is less expensive, in comparison to the conventional fail-safe actuating systems. In the fail-safe actuating system 100, the actuator 102 is operated in two independent operating modes, where in the first operating mode, the actuator 102 biases only the biasing element 120 without moving the output element 108 or the controlled device 104, and in the second operating mode, the actuator 102 actuates only the controlled device 104. The biasing of the biasing element 120 and the actuation of the controlled device 104 are made independent of each other in an easy and efficient manner, for example, without using a clutch assembly. This makes the fail-safe actuating system 100 substantially less complex and also substantially less expensive in comparison to the conventional fail-safe actuating systems.

Further, in the fail-safe actuating system 100, during the second operating mode, i.e., when the controlled device 104 is being moved between the open or closed positions, the actuator 102 has to overcome only the resistance offered by the controlled device 104 and need not work against the biasing element 120. With this, the actuator 102 used in the fail-safe actuating system 100 need not be as powerful as required in the conventional fail-safe actuating systems. Also, the wear and tear, and the energy spent in the fail-safe actuating system 100 is substantially less in comparison to the conventional fail-safe actuating systems.

Further, in the fail-safe actuating system 100, the biasing element 120, during the fail-safe operation, moves the entire actuator 102, i.e., the actuator housing 106 and the output element 108, together, which in-turn moves the controlled device 104 to the fail-safe position. Since the output element 108 is not moved independent of the actuator housing 106, the detent torque, if any, in the actuator 102, does not affect the fail-safe operation. The detent torque, if any, of the actuator 102 is used to the fail-safe actuating system's advantage in the present subject matter. Also, since, the output element 108 and/or the speed reducing unit 118, i.e., the gear train, are not moved and reversed with respect to the actuator housing 106 during the fail-safe operation, the biasing element 120 does not have to overcome the detent torque of the actuator 102 and/or the additional torque due to the speed reducing unit 118. The biasing element 120 has to overcome only the resistance offered by the controlled device 104 during the fail-safe operation. This eliminates the usage of a substantially strong biasing element, i.e., a strong spring, which is otherwise used in the conventional fail-safe actuating systems. This facilitates in reducing the size and the cost of the biasing element 120 to be used in the fail-safe actuating system 100. Furthermore, as there is no reverse movement of the output element 108 and/or the speed reducing unit 118, i.e., the gear train, with respect to the actuator housing 106 during the fail-safe operation, damages to the actuator 102 and to the speed reducing unit 118 are prevented.

Furthermore, in conventional fail-safe actuating systems, where the prime mover, i.e., the motor, and the gear train play an active role in moving the controlled device to a fail-safe position, the motor and the gear train have to be made of fire resistant material that can withstand high temperatures, due to fire, for the time required to move the controlled device to the fail-safe position. Whereas, in the fail-safe actuating system 100, the prime mover 112, such as a motor, and the speed reducing unit 118, such as a gear train, do not contribute and play no active role in the fail-safe operation, as the engaging unit 130 may be provided to move the output element 108 together with the actuator housing 106 during the fail-safe operation. As a result, the prime mover 112 and the speed reducing unit 118 can be made of low cost materials, such as plastics. In the fail-safe actuating system 100, the actuator housing 106, output element 108, engaging unit 130 and coupler unit 110, i.e., the parts that play an active role during fail-safe operation, may have to be made of a fire resistant material. This facilitates in reducing the cost of the fail-safe actuating system 100 in comparison to the conventional fail-safe actuating systems.

The description hereinafter describes some embodiments of the fail-safe actuating system of the present subject matter. It should be noted that the description and figures merely illustrate the principles of the present subject matter. The invention is, by no means, restricted to the illustrated embodiments.

Figure 2:
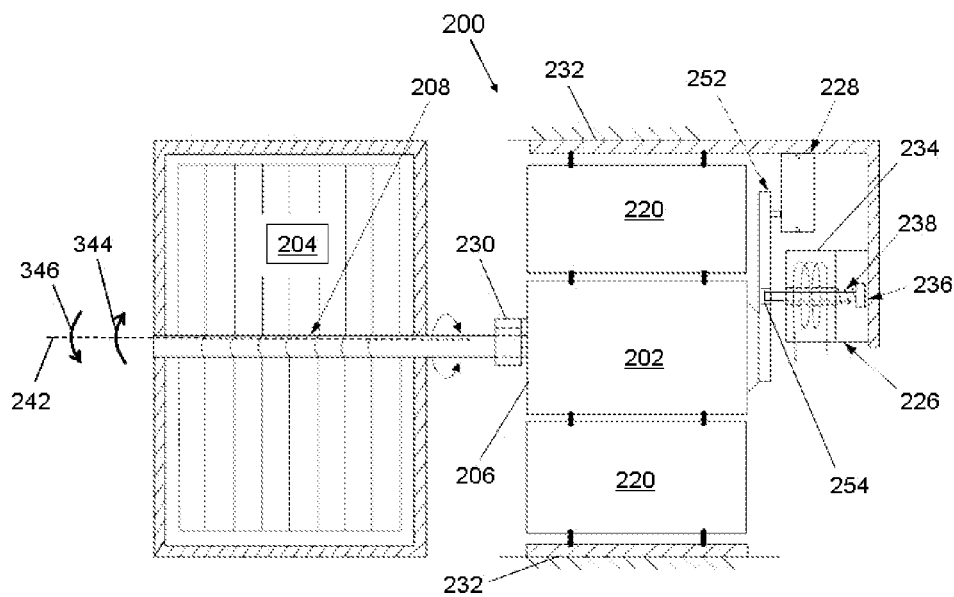
FIG. 2 illustrates a fail-safe actuating system, according to an embodiment of the present subject matter.

FIG. 2 illustrates a fail-safe actuating system 200, according to an embodiment of the present subject matter. The fail-safe actuating system 200 is configured to actuate a controlled device 204 (damper-type) and move the controlled device 204 to a fail-safe position in case of a failure of the power or an emergency. The fail-safe actuating system 200 includes an actuator 202 with an actuator housing 206 and an output element 208. The output element 208, as shown, is a rotatable output shaft projecting out from the actuator housing 206.

As shown, the output element 208 is directly coupled to the controlled device 204, such that the controlled device 204 moves in conjunction with the output element 208. Although FIG. 2 shows a damper as the controlled device 204, which may be used for controlling and regulating the flow of air or a gas; in another implementation, the controlled device 204 may be a valve for controlling or regulating the flow of liquids across the valve, or may be any movable member which is to be moved between predefined positions. For the sake of simplicity, only one controlled device 204 is shown in FIG. 2; however, more than one such controlled device may be coupled to move in conjunction with the output element 208.

In an implementation, as shown in FIG. 2, the actuator 202 is an electrical actuator having a motor as a prime mover (not shown). The motor has a rotor and a stator, where the rotor is fixedly coupled to the output of the motor and the stator is fixedly coupled to the housing of the motor. The housing of the motor is fixedly coupled to the actuator housing 206. The output of the motor is coupled to the output element 208, such that both move in conjunction with each other. In an implementation, the output of the motor may be coupled to the output element 208 through a speed reducing unit (not shown), for example a gear train, to reduce the speed and increase the torque at the output element 208, as mentioned earlier.

The fail-safe actuating system 200 also includes a biasing element 220. The biasing element 220 may be a coil spring or a torsion spring surrounding the actuator 202. For the purposes of description hereinafter, the biasing element 220 may be referred to as a spring 220. The spring 220, at one end, is coupled to the actuator housing 206 and, at the other end, is coupled to a rigid support 232. The spring 220 is coupled between the actuator housing 206 and the rigid support 232 such that the spring 220 is biased upon the movement of the actuator housing 206 in a first predefined direction. The biasing of the spring 220 upon the movement of the actuator housing 206 is described later in the description.

Further, the fail-safe actuating system 200 includes a controller (not shown), a locking device 226 and a limit switch 228. The actuator 202, for its operation, is coupled to a power supply (not shown) through the controller. The controller is configured to operate the actuator 202 in the first operating mode and in the second operating mode. In the first operating mode, the output element 208 is stationary, and the actuator housing 206 is moved with respect to the output element 208 for biasing the spring 220. In the second operating mode, the actuator housing 206 is stationary, and the output element 208 is moved with respect to the actuator housing 206 for moving the controlled device 204. Further, the locking device 226 is coupled to the power supply, may be through the controller, for setting the locking device 226 in the ON-state or the OFF-state, and the limit switch 228 is coupled to the controller to indicate the controller for switching the mode of operation of the actuator 202, as mentioned earlier. The aforementioned couplings in the fail-safe actuating system 200 are similar to the ones shown in FIG. 1 and, thus, are not shown in FIG. 2 for the sake of simplicity.

FIG. 2 shows the locking device 226 as an electromagnetic locking device, according to an implementation, for locking the actuator housing 206. In said implementation, the locking device 226 includes a solenoid 234 and a plunger 236 with a plunger spring 238 as shown. In the active state of the power supply, the locking device 226 is in an ON-state, as mentioned earlier. In the ON-state, the solenoid 234 and the plunger 236 interact electromagnetically such that an electromagnetic force between the solenoid 234 and the plunger 236 pushes the plunger 236 out from the locking device 226. The pushing out of the plunger 236 causes the plunger spring 238 to compress against a housing of the solenoid 234. In the cut-off state of the power supply, the locking device 226 is switched to an OFF-state, as mentioned earlier. In the OFF-state, the electromagnetic force of interaction between the solenoid 234 and the plunger 236 is removed. With the removal of the electromagnetic force, the plunger 236 is no more pushed out. At this, the plunger spring 238 gets released from the compressed state to move the plunger 236 back inside the locking device 226. The locking and the unlocking of the actuator housing 206 by the locking device 226 are described in detail later in the description.

Further, the fail-safe actuating system 200 includes an engaging unit 230 that is configured to engage the actuator housing 206 with the output element 208, such that the output element 208 moves together with the actuator housing 206 during the fail-safe operation. The construct and the functioning of the engaging unit 230 are described later, with reference to FIGS. 4(a) and 4(b).

Figure 3A:
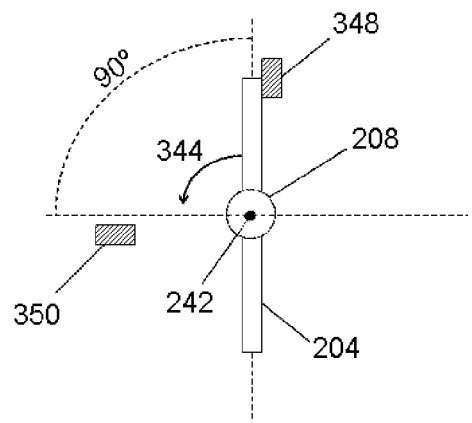
FIG. 3(a) illustrates a fully closed position of a controlled device, according to an embodiment of the present subject matter.
Figure 3B:
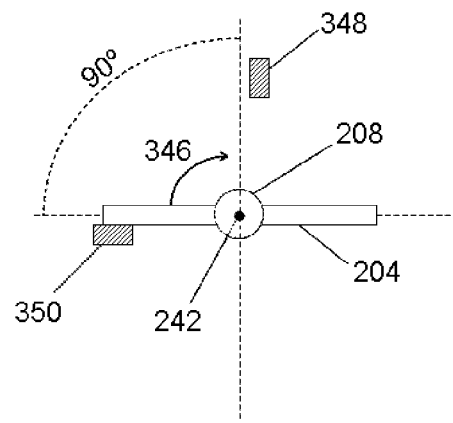
FIG. 3(b) illustrates a fully open position of a controlled device, according to an embodiment of the present subject matter.

The controlled device 204 is movable between predefined positions. The predefined positions of the controlled device 204 include a fully open position and a fully closed position. With reference to FIG. 2, the controlled device 204 is movable about an axis 242 of the output element 208 and is movable by 90° between the fully open and fully closed positions. FIGS. 3(a) and 3(b) illustrate the fully closed position and the fully open position, respectively, of the controlled device 204, according to an embodiment of the present subject matter. The fully closed position of the controlled device 204 may be a vertical position, and the fully open position of the controlled device 204 may be a horizontal position. The controlled device 204 is movable by 90° between the fully closed position and the fully open position, as indicated by arrows 344 and 346. The movement of the controlled device 204 is restricted beyond the 90° sector by blocks 348 and 350, as shown.

For the sake of ease of description of operation of the fail-safe actuating system 200, the arrows 344 and 346 depicting the directions of movement are shown in FIG. 2. In FIG. 2, the controlled device 204 is shown in the fully closed position. From the fully closed position, the controlled device 204 is movable by 90°, in the direction indicated by the arrow 344, to attain the fully open position. From the fully open position, the controlled device 204 is movable by 90°, in the direction indicated by the arrow 346, to attain the fully closed position. Also, from the fully closed position the controlled device 204 is not further movable in the direction of arrow 346 and is blocked by the block 348 (not shown in FIG. 2), and from the fully open position the controlled device 204 is not further movable in the direction of arrow 344 and is blocked by the block 350 (not shown in FIG. 2).

The description below describes the operation of the fail-safe actuating system 200 and the components of the fail-safe actuating system 200 for biasing the spring 220 and for operating the controlled device 204. In one instance, let us say, the controlled device 204 is in the fully closed position and the spring 220 is in a substantially unbiased state. In the substantially unbiased state, the spring 220 is in a released state and does not have any stored energy. From this state, as the power supply is switched on, the controller first operates the actuator 202 in the first operating mode, in which the output element 208 is stationary and the actuator housing 206 is moved with respect to the output element 208 to bias the spring 220. For this, the controller provides current in a first direction, from the power supply to the actuator 202, such that the electromagnetic interaction between the stator and the rotor of the motor (prime mover) forces the output element 208 to move in the direction of arrow 346. Since the controlled device 204 is blocked and is not further movable in the direction of arrow 346 from the fully closed position, the output element 208 is not moved. In return, due to the electromagnetic interaction in the prime mover, the stator and the housing of the motor, and hence the actuator housing 206, is moved in the direction of arrow 344. This movement of the actuator housing 206 in the direction of arrow 344 biases the spring 220. The actuator 202 may be operated in the first operating mode to move the actuator housing 206 to substantially bias the spring 220 before the actuator housing 206 is locked by the locking device unit 226.

As mentioned earlier, in the first operating mode, the actuator housing 206 is rotated to move from a first predefined position to a second predefined position. The first predefined position of the actuator housing 206 may be defined as a position at which the spring 220 is substantially unbiased, and the second predefined position of the actuator housing 206 may be defined as a position at which the spring 220 is substantially biased. The actuator housing 206 is locked at the second predefined position by the locking device 226 for holding the spring 220 in the biased state.

In an implementation, as shown in FIG. 2, an extension element 252, such as an arm or a plate, is coupled to the actuator housing 206 such that the extension element 252 is moved in conjunction with the actuator housing 206. With reference to FIG. 2, at the first predefined position of the actuator housing 206 the extension element 252 is in a substantially horizontal position, and at the second predefined position of the actuator housing 206 the extension element 252 is in a substantially vertical position. In an implementation, the extension element 252 may be provided with a slot 254, such that the plunger 236 of the locking device 226 gets fit in the slot 254 to lock the actuator housing 206 at the second predefined position. It may be understood that, as the power supply is in the active state, the locking device 226 is in the ON-state and, due to the electromagnetic interaction between the solenoid 234 and the plunger 236, as described earlier, the plunger 236 is pushed out of the locking device 226 to fit in the slot 254 and the plunger spring 238 is compressed.

Further, as the actuator housing 206 biases the spring 220 and reaches the second predefined position, the limit switch 228 indicates the controller to switch the operation of the actuator 202 from the first operating mode to the second operating mode.

In an implementation, as shown in FIG. 2, the extension element 252 is configured to couple with the limit switch 228 at the second predefined position of the actuator housing 206. Upon the coupling of the extension element 252 with the limit switch 228, the limit switch 228 indicates the controller for the switching of the operation mode of the actuator 202.

After biasing the spring 220 and locking the actuator housing 206 at the second predefined position for holding the spring 220 in the biased state, the controller operates the actuator 202 in the second operating mode, in which the actuator housing 206 is locked and, hence, is stationary, and the output element 208 is moved for moving and positioning the controlled device 204. For opening the controlled device 204 from the fully closed position, the controller may first provide current in a second direction, from the power supply to the motor (prime mover), such that the electromagnetic interaction between the stator and the rotor of the motor causes the output element 208 to move in the direction of arrow 344. This movement of the output element 208 causes the controlled device 204 to open. The second direction of current is opposite to the first direction of current in which the output element 208 is moved the direction indicated by arrow 346. After opening the controlled device 204, the controller may provide current in the first direction to move the output element 208 in the direction of arrow 346 to close the controlled device 204.

In an implementation, in the second operating mode, the controller can be configured to regulate the current between the second direction and the first direction, from the power supply to the actuator 202, to move the output element 208 to vary the degree of opening or closing of the controlled device 204 in a range 0° to 90° as per the requirement.

Figure 4A:
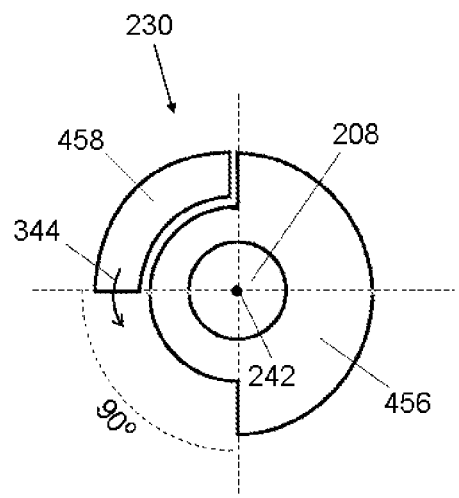
FIG. 4(a) illustrates an engaging unit of the fail-safe actuating system, according to an embodiment of the present subject matter.
Figure 4B:
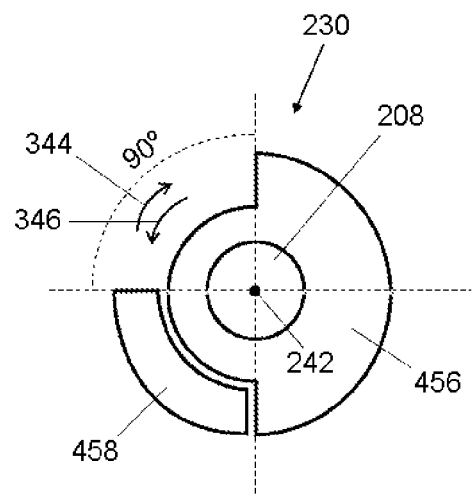
FIG. 4(b) illustrates the engaging unit of FIG. 4(a) at a locked state of the actuator housing.

FIGS. 4(a) and 4(b) illustrate the engaging unit 230, according to an embodiment of the present subject matter. The engaging unit 230 includes a semi-circular block 456 fixedly coupled to the output element 208 and includes a quarter block 458 fixedly coupled to the actuator housing 206 (not shown in FIG. 4(a)). FIG. 4(a) shows the engaging unit 230 in a state when the controlled device 204 is in fully closed position and the actuator housing 206 is at the first predefined position at which the spring 220 is substantially unbiased. FIG. 4(b) shows the engaging unit 230 in a state when the actuator housing 206 is at the second predefined position and the controlled device 204 is still fully closed. During the first operating mode of the actuator 202, the quarter block 458 moves by 90° together with the actuator housing 206 in the direction of arrow 344. During the second operating mode of the actuator 202, the semi-circular block 456 moves within 90° together with the output element 208 in the directions of arrows 344 and 346. For the sake of ease of understanding, arrows 344 and 346 in FIGS. 4(a) and 4(b) depict the directions of movement as depicted in FIGS. 2, 3(a), and 3(b). Further, the movement of the semi-circular block 456 and the quarter block 458 during the fail-safe operation is described later in the description.

The description below describes the fail-safe operation of the fail-safe actuating system 200 for moving the controlled device 204 to a fail-safe position in case of a power failure or an emergency. With reference to FIG. 2, the fail-safe position of the controlled device 204 is the fully closed position. However, in another implementation, the fail-safe position of the controlled device 204 may be the fully open position. For the description of the fail-safe operation, let us assume the controlled device 204 is in the fully open position, and is to be moved to the fully closed position (fail-safe position).

In case of a cut-off of the power supply due to a power failure or any emergency, the power to the actuator 202 is stopped and the locking device 226 is set in the OFF-state. As described earlier, in the OFF-state, the electromagnetic interaction between the solenoid 234 and the plunger 236 is removed, which causes the plunger 236 to move out from the slot 254 of the extension element 252. This moving out of the plunger 236 from the slot 254 unlocks the extension element 252 and hence unlocks the actuator housing 206.

Further, the unlocking of the actuator housing 206 allows the spring 220 to unbias or release. The unbiasing or releasing of the spring 220 forces the actuator housing 206 to move back in the direction of arrow 346, from the second predefined position to the first predefined position. This movement of the actuator housing 206 allows the quarter block 458, fixedly coupled with the actuator housing 206, to engage with the semi-circular block 456 to move the semi-circular block 456 and hence the output element 208 together in the direction of arrow 346. This movement of the output element 208 causes the controlled device 204 to move to the fully closed position (fail-safe position).

Further, during the fail-safe operation, in the actuator 202, the housing and the stator of the motor (prime mover), coupled to the actuator housing 206, move together with the actuator housing 206. In an implementation, where the actuator 202, particularly the motor (prime mover), has a detent torque, the rotor of the motor does not rotate with respect to the stator in the absence of power. This causes the output of the motor, and hence the output element 208, to move back together with the actuator housing 206 in the direction of arrow 346. This movement of the output element 208 causes the controlled device 204 to move to the fully closed position (fail-safe position).

Further, in an implementation where the actuator 202 has a speed reducing unit (not shown), the speed reducing unit may be a non-reversible type speed reducing unit which may include a worm-screw arrangement, a nut-screw arrangement, or any other type of conventional non-reversible arrangement: As described earlier, this type of speed reducing unit may force the output element 208 to move together with the actuator housing 206 during fail-safe operation, for moving the controlled device 204 to the fail-safe position.

The arrangement and operation of fail-safe actuating system 200, as described above, is simple in comparison to the conventional fail-safe actuating systems. The simple arrangement makes the fail-safe actuating system 200 less costly in comparison to the conventional fail-safe actuating systems. Further, the biasing of the biasing element, movement of the controlled device, and the fail-safe operation of the fail-safe actuating system 200 are substantially easy and efficient.

Figure 5A:
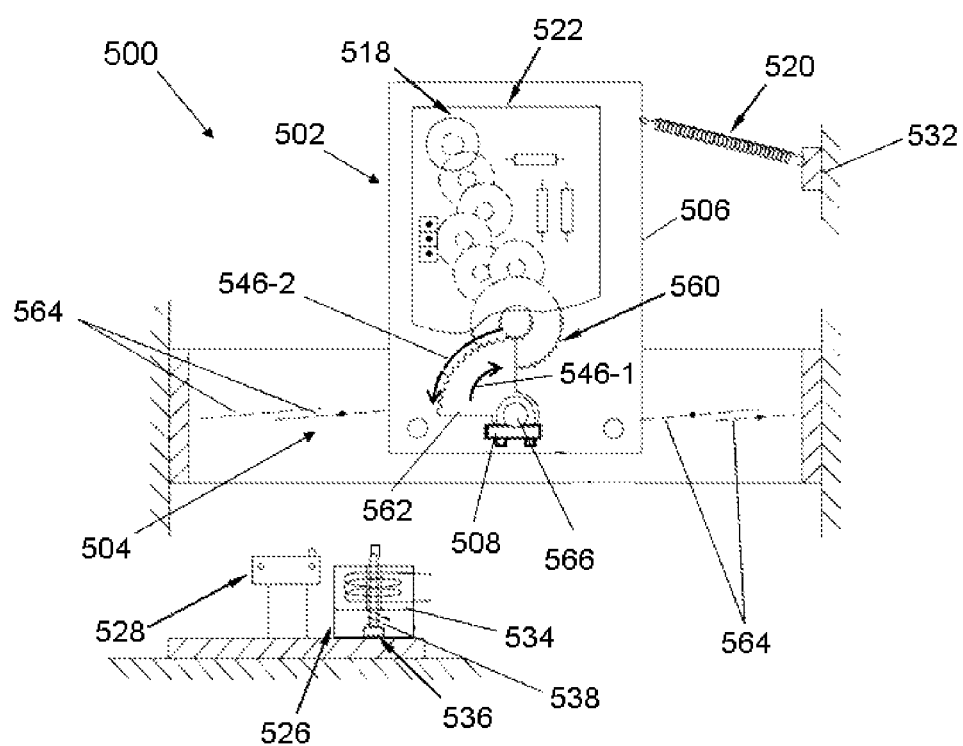
FIG. 5(a) illustrates a fail-safe actuating system at an initial position, according to another embodiment of the present subject matter.

FIG. 5(a) illustrates a fail-safe actuating system 500, according to another embodiment of the present subject matter. The fail-safe actuating system 500 is configured to actuate a damper-type controlled device 504, as shown. FIG. 5(a) shows the fail-safe actuating system 500 in an initial position, in which the controlled device 504 is in fully closed position and the biasing element 520 is in substantially unbiased state. The fail-safe actuating system 500 includes an actuator 502 with an actuator housing 506 and an output element 508. The output element 508 may be a rotatable clamp.

In an implementation, the actuator 502 is an electrical actuator having a motor as the prime mover (not shown). The motor has a rotor and a stator, where the rotor is fixedly coupled to the output of the motor and the stator is fixedly coupled to the housing of the motor. The housing of the motor is fixedly coupled to the actuator housing 506. The output of the motor is coupled to a gear train 518 having a plurality of gears as shown, which functions as a speed reducing unit. The output of the gear train 518 is coupled to the output element 508 through a pinion gear 560 and a sector gear 562. The pinion gear 560 is meshed with the sector gear 562, as shown, such that both are movable with respect to, each other. In an implementation, the sector gear 562 may be a 90° sector gear. Further, the sector gear 562 is fixedly coupled to the output element 508.

The controlled device 504 includes more than one damper 564 that are rotated through a main damper shaft 566. The main damper shaft 566 of the controlled device 504 is coupled to the output element 508, such that the main damper shaft 566 and the dampers 564 of the controlled device 504 move in conjunction with the output element 508. The output element 508 clamps the main damper shaft 566.

The biasing element 520 in the fail-safe actuating system 500 may be an expansion spring. For the purposes of description hereinafter, the biasing element 520 may be referred to as a spring 520. The spring 520, at one end, is coupled to the actuator housing 506 and, at the other end, is coupled to a rigid support 532.

The fail-safe actuating system. 500 also includes a controller 522, through which the actuator 502 is coupled to a power supply (not shown in FIG. 5(a)). As shown in FIG. 5(a), the controller 522 is inside the actuator housing 506. As mentioned earlier, the controller 522 is configured to operate the actuator 502 in a first operating mode, in which the output element 508 is stationary and the actuator housing 506 is moved with respect to the output element 508 for biasing the spring 520; and in the second operating mode, in which the actuator housing 506 is stationary and the output element 508 is moved for operating the controlled device 520 for positioning the dampers 564.

The fail-safe actuating system 500 also includes a locking device 526 and a limit switch 528. The locking device 526 and the limit switch 528, in FIG. 5(a), are similar to the ones shown in FIG. 2. The locking device 526 is an electromagnetic locking device having a solenoid 534 and a plunger 536 with a plunger spring 538. The locking device 526 is coupled to the power supply, may be through the controller 522, for setting the locking device 526 in the ON-state or the OFF-state, as mentioned earlier. Further, the limit switch 528 is coupled to the controller 522 to indicate the controller 522 for switching the mode of operation of the actuator 502, as mentioned earlier. The aforementioned couplings in the fail-safe actuating system 500 are similar to the ones shown in FIG. 1 and, thus, are not shown in FIG. 5(a) for the sake of simplicity.

Figure 5B:
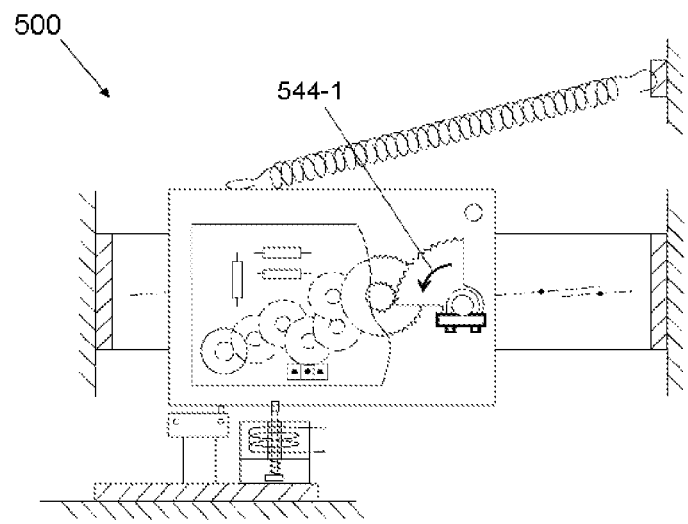
FIG. 5(b) illustrates the fail-safe actuating system of FIG. 5(a) at a locked state of actuator housing.
Figure 5C:
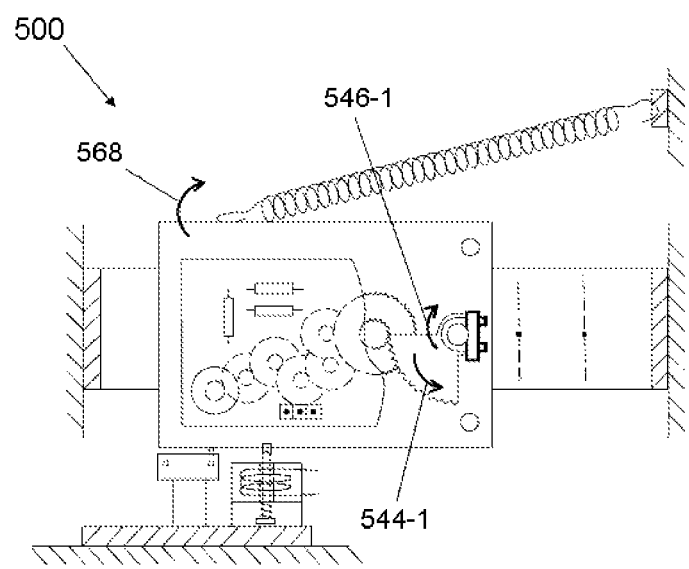
FIG. 5(c) illustrates the fail-safe actuating system of FIG. 5(a) at a fully open state of controlled devices.

FIG. 5(b) illustrates the fail-safe actuating system 500 of FIG. 5(a) at a locked state of actuator housing 506 after operating the actuator 502 in the first operating mode, and FIG. 5(c) illustrates the fail-safe actuating system 500 of FIG. 5(a) at a fully open state of the controlled device 504 after operating the actuator 502 in the second operating mode.

It may be noted that the dampers 564 are movable by 90° between the fully closed position and the fully open position. From the fully closed position, as shown in FIG. 5(a), the output element 508, the sector gear 562, the main damper shaft 566 and the dampers 564 are not further movable in the direction of arrow 546-1. From the fully open position, as shown in FIG. 5(c), the output element 508, the sector gear 562, the main damper shaft 566 and the dampers 564 are not further movable in the direction of arrow 544-1.

Further, the fail-safe actuating system 500 includes an engaging unit (not shown in FIG. 5(a)) that is configured to engage the actuator housing 506 with the output element 508, such that the output element 508 moves together with the actuator housing 506 during the fail-safe operation. The construct and the functioning of the engaging unit in the fail-safe actuating system 500 are similar that of the engaging unit 230 as shown and described with reference to FIGS. 4(a) and 4(b).

The description below describes the operation of the fail-safe actuating system 500 and the components of the fail-safe actuating system 500 for biasing the spring 520 and for operating the controlled device 504. With reference to FIG. 5(a), the controller 522 first operates the actuator 502 in the first operating mode, in which the output element 508 is stationary and the actuator housing 506 is moved with respect to the output element 508 to bias the spring 520. For this, the controller 522 provides current in a first direction, from the power supply to the actuator 502, such that the output element 508 and the sector gear 562 are moved in the direction of arrow 546-1. Since the dampers 564 are blocked to further move in the direction of arrow 546-1 from the fully closed position, the main dampers shaft 566, the output element 508 and the sector gear 562 are not moved in the direction of arrow 546-1. In return, the pinion gear 560 rotates and moves in the direction of arrow 546-2, over the meshed sector gear 562. This movement of the pinion gear 560 moves the actuator housing 506 in the direction of arrow 546-2. This movement of the actuator housing 506 in the direction of arrow 546-2 biases the spring 520.

After the pinion gear 560 and the actuator housing 506 are moved in the direction of arrow 546-2 by 90°, the actuator housing 506 is locked by the locking device 526 for holding the spring 520 in the biased state. In an implementation, the actuator housing 506 is provided with a slot (not shown) in which the plunger 536 fits to lock the actuator housing 506. It may be understood that, as the power supply is in the active state, the locking device 526 is in the ON-state and, due to the electromagnetic interaction between the solenoid 534 and the plunger 536, as described earlier, the plunger 536 is pushed out of the locking device 526 to fit in the slot of the actuator housing 506 and the plunger spring 538 is compressed. The locked state of the actuator housing 506 is shown in FIG. 5(b).

Further, at the locked state, the actuator housing 506 mechanically, electrically, magnetically, optically or inductively couples with the limit switch 528. Upon this coupling of the actuator housing 506 with the limit switch 528, the limit switch 528 indicates the controller 522 for the switching of the operation mode of the actuator 502.

After biasing the spring 520 and locking the actuator housing 506 for holding the spring 520 in the biased state, the controller 522 operates the actuator 502 in the second operating mode, in which the actuator housing 506 is locked and, hence, is stationary, and the output element 508 is moved for moving and positioning the dampers 564. For opening the dampers 564 from the fully closed position, the controller 522 may first provide current in a second direction (opposite to the first direction), from the power supply to the actuator 502, such that the output element 508 and the sector gear 562 are moved in the direction of arrow 544-1 (see FIG. 5(c)). This movement of the output element 508 and the sector gear 562 cause the main damper shaft 566 to move in the direction of arrow 544-1. This movement of the main damper shaft 566 opens the dampers 564, as shown in FIG. 5(c). After the dampers 564 are open, the controller 522 may provide current in the first direction to move the output element 508 and the main damper shaft 566 in the direction of arrow 546-1 to close the dampers 564. In this way, the opening and closing of the dampers 564 can be regulated in a range 0° to 90° as per the requirement.

The description below describes the fail-safe operation of the fail-safe actuating system 500 for moving the dampers 564 to a fail-safe position in case of a power failure or an emergency. With reference to FIGS. 5(a), 5(b) and 5(c), the fail-safe position of the dampers 564 is the fully closed position. For the description of the fail-safe operation with reference to FIG. 5(c), let us assume the dampers 564 are in the fully open position, and are to be moved to the fully closed position (fail-safe position).

As the power supply is cut-off due to a power failure or any emergency, the power to the actuator 502 is stopped and the locking device 526 is set in the OFF-state. In the OFF-state, the locking device 526 unlocks the actuator housing 506 from the locked state. The unlocking of the actuator housing 506 allows the spring 520 to unbias or release. The unbiasing or releasing of the spring 520 forces the actuator housing 506 to move back in the direction of arrow 568 (see FIG. 5(c)). This movement of the actuator housing 506 allows the engaging unit (not shown) in the fail-safe actuating system 500 to engage the actuator housing 506 with the output element 508 such that the output element 508 is also moved in the direction of arrow 546-1. This movement of the output element 508 causes the main damper shaft 566 and hence the dampers 564 to move to the fully closed position (fail-safe position).

Further, during the fail-safe operation, in the actuator 502, the housing and the stator of the motor (prime mover), coupled to the actuator housing 506, move together with the actuator housing 506. In an implementation, where the actuator 502, particularly the motor (prime mover), has a detent torque, the rotor of the motor does not rotate with respect to the stator in the absence of power. This causes the output of the motor, and hence the output element 508, to move back together with the actuator housing 506 in the direction of arrow 546-1. This movement of the output element 508 causes the main damper shaft 566 and the dampers 564 to move to the fully closed position (fail-safe position).

Further, in an implementation, the gear train 518 may be a non-reversible type gear train which may include a worm-screw arrangement, a nut-screw arrangement, or any other type of conventional non-reversible arrangement. As described earlier, this type of gear train 518 may force the output element 508 to move together with the actuator housing 506 during fail-safe operation, for moving the dampers 564 to the fail-safe position.

Figure 6A:
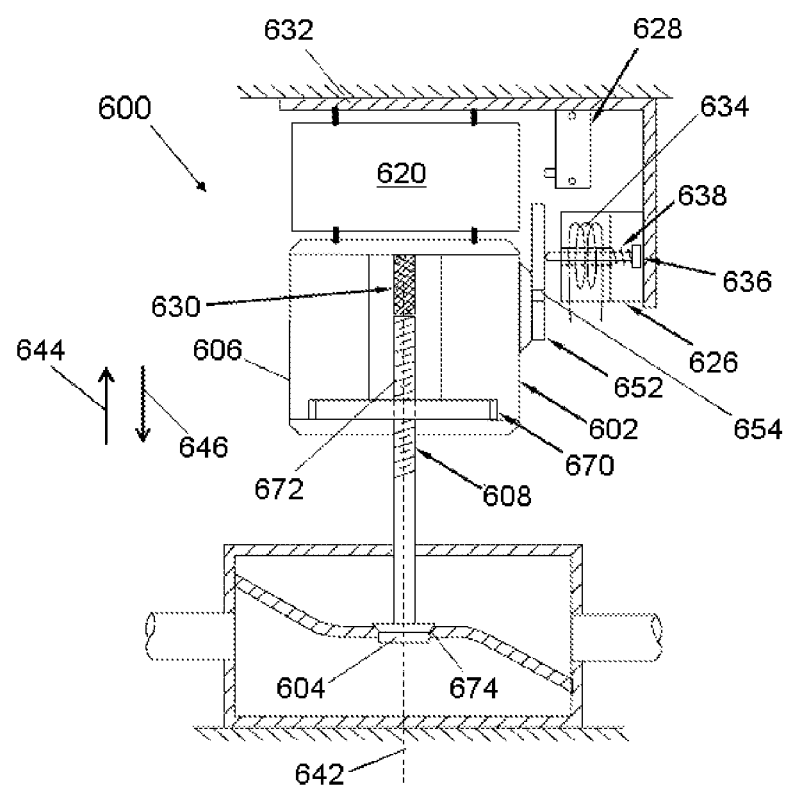
FIG. 6(a) illustrates a fail-safe actuating system at an initial position, according to another embodiment of the present subject matter.

FIG. 6(a) illustrates a fail-safe actuating system 600, according to another embodiment of the present subject matter. The fail-safe actuating system 600 is configured to actuate a valve-type controlled device 604, as shown. FIG. 6(a) shows the fail-safe actuating system 600 in an initial position, in which the controlled device 604 is in fully closed position and the biasing element 620 is in substantially unbiased state. The fail-safe actuating system 600 includes an actuator 602 with an actuator housing 606 and an output element 608. The output element 608, as shown, is a shaft which is axially movable along the axis 642. For the purpose of description hereinafter, the output element 608 may be referred to as a shaft 608.

In an implementation, the actuator 602 is an electrical actuator having a motor as a prime mover (not shown). The motor has a rotor and a stator, where the rotor is fixedly coupled to the output of the motor and the stator is fixedly coupled to the housing of the motor. The housing of the motor is fixedly coupled to the actuator housing 606. The output of the motor is coupled to a gear 670 that rotates about the axis 642 as the actuator 602, particularly the motor, is operated. As shown in FIG. 6(a), the gear 670 is inside the actuator housing 606 and coupled to the actuator housing 606, such that the gear 670 and the actuator housing 606 are axially movable together. The gear 670, at the centre, has a hole, along the axis 642, with internal threads (not shown). The shaft 608 has external thread 672 thereon, matching with internal threads of the gear 670. The gear 670 and the shaft 608 are coupled to each other through their respective threads, i.e., the internal threads and the external threads 672, such that the rotation of gear 670 about the axis 642 causes the shaft 608 to move axially along the axis 642. An arrangement (not shown in FIG. 6(a)) is provided to prevent rotation motion of the shaft 608 about the axis 642. In an implementation, the external threads 672 on the shaft 608 are provided in a predefined region of the shaft, which is movable inside the gear 670. Further, in an implementation, the output of the motor may be coupled to the gear 670 through a gear train (not shown) that functions as a speed reducing unit to reduce the speed and increase the torque at the gear 670, and particularly at the shaft 608.

Further, the valve-type controlled device 604 may be directly coupled to the shaft 608, such that the controlled device 604 moves in conjunction with the shaft 608. The axial movement of the shaft 608 causes the controlled device 604 to move in the axial direction along the axis 642. The controlled device 604 is lifted from a valve seat 674 for opening the controlled device 604. From the fully closed position, as shown in FIG. 6(a), the controlled device 604 is not further movable in the direction of arrow 646.

The biasing element 620 in the fail-safe actuating system 600 may be a compression spring. For the purposes of description hereinafter, the biasing element 620 may be referred to as a spring 620. The spring 620, at one end, is coupled to the actuator housing 606 and, at the other end, is coupled to a rigid support 632.

The fail-safe actuating system 600 also includes a controller (not shown in FIG. 6(a)), through which the actuator 602 is coupled to a power supply (not shown in FIG. 6(a)). As mentioned earlier, the controller is configured to operate the actuator 602 in a first operating mode, in which the shaft 608 is stationary and the actuator housing 606 is moved with respect to the shaft 608 for biasing the spring 620; and in the second operating mode, in which the actuator housing 606 is stationary and the shaft 608 is moved for operating and positioning the controlled device 604.

The fail-safe actuating system 600 also includes a locking device 626 and a limit switch 628. The locking device 626 and the limit switch 628, in FIG. 6(a), are similar to the ones shown in FIG. 2. The locking device 626 is an electromagnetic locking device having a solenoid 634 and a plunger 636 with a plunger spring 638. The locking device 626 is coupled to the power supply, may be through the controller, for setting the locking device 626 in the ON-state or the OFF-state, as mentioned earlier. Further, the limit switch 628 is coupled to the controller to indicate the controller for switching the mode of operation of the actuator 602, as mentioned earlier. The aforementioned couplings in the fail-safe actuating system 600 are similar to the ones shown in FIG. 1 and, thus, are not shown in FIG. 6(a) for the sake of simplicity.

Further, an extension element 652, such an arm or a plate, is coupled to the actuator housing 606, such that the extension element 652 is moved in conjunction with the actuator housing 606. The extension element 652 is provided with a slot 654, such that, in the ON-state of the locking device 626, the plunger 636 gets fit in the slot 654 to lock the actuator housing 606.

Further, the fail-safe actuating system 600 includes an engaging unit 630 that is configured to engage the actuator housing 606 with the shaft 608, such that the shaft 608 moves together with the actuator housing 606 during the fail-safe operation. In an implementation, the engaging unit 630 may be a block, as shown in FIG. 6(a), fixedly coupled to the actuator housing 606.

Figure 6B:
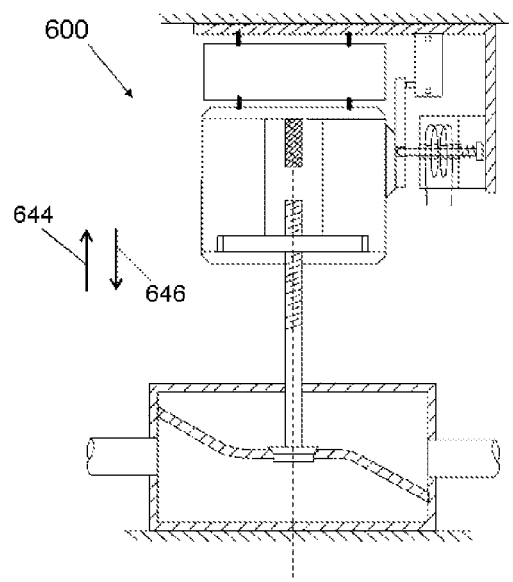
FIG. 6(b) illustrates the fail-safe actuating system of FIG. 6(a) at a locked state of actuator housing.
Figure 6C:
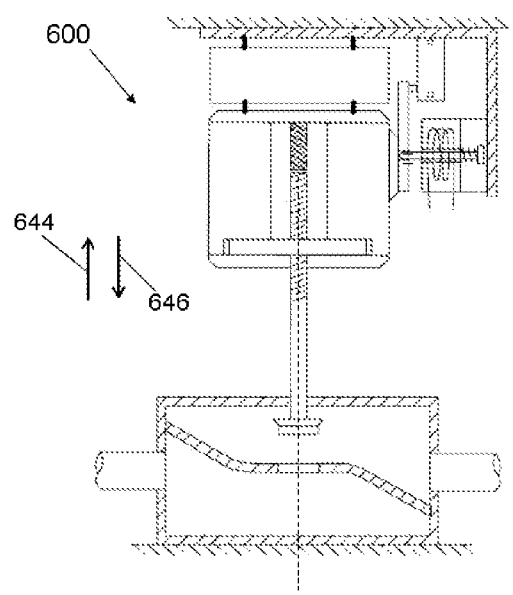
FIG. 6(c) illustrates the fail-safe actuating system of FIG. 6(a) at a fully open state of controlled device.

FIG. 6(b) illustrates the fail-safe actuating system 600 of FIG. 6(a) at a locked state of actuator housing 606 after operating the actuator 602 in the first operating mode, and FIG. 6(c) illustrates the fail-safe actuating system 600 of FIG. 6(a) at a fully open state of the controlled device 604 after operating the actuator 602 in the second operating mode.

The description below describes the operation of the fail-safe actuating system 600 and the components of the fail-safe actuating system 600 for biasing the spring 620 and for operating the controlled device 604. With reference to FIG. 6(a), the controller first operates the actuator 602 in the first operating mode, in which the shaft 608 is stationary and the actuator housing 606 is moved with respect to the shaft 608 to bias the spring 620. For this, the controller provides current in a first direction, from the power supply to the actuator 602, such that the gear 670 is rotated to move the shaft 608 in the direction of arrow 646. Since the controlled device 604 is blocked by the valve seat 674 to further move in the direction of arrow 646 from the fully closed position, the shaft 608 is not moved. In return, the gear 670 moves over the threads 672 on the shaft 608 and in the direction of 644. This movement of the gear 670 moves the actuator housing 606 in the direction of arrow 644. This movement of the actuator housing 606 in the direction of arrow 644 biases the spring 620.

With the movement of the actuator housing 606, the extension element 652 also moves in the direction of arrow 644. At a position of the extension element 652, as shown in FIG. 6(b), the plunger 636 of the locking device 626 fits in the slot 654 to lock the actuator housing 606 for holding the spring 620 in the biased state. It may be understood that, as the power supply is in the active state, the locking device 626 is in the ON-state and, due to the electromagnetic interaction between the solenoid 634 and the plunger 636, as described earlier, the plunger 636 is pushed out of the locking device 626 to fit in the slot 654 of the extension element 652 and the plunger spring 638 is compressed. The locked state of the actuator housing 606 is shown in FIG. 6(b).

Further, at the locked state, the extension element 652 mechanically, electrically, magnetically, optically or inductively couples with the limit switch 628. Upon this coupling of the extension element 652 with the limit switch 628, the limit switch 628 indicates the controller for the switching of the operation mode of the actuator 602.

After biasing the spring 620 and locking the actuator housing 606 for holding the spring 620 in the biased state, the controller operates the actuator 602 in the second operating mode, in which the actuator housing 606 is locked and, hence, is stationary, and the shaft 608 is moved for moving and positioning the controlled device 604. For opening the controlled device 604 from the fully closed position, the controller may first provide current in a second direction (opposite to the first direction), from the power supply to the actuator 602, such that the gear 670 is rotated to move the shaft 608 in the direction of arrow 644. This movement of the shaft 608 causes the controlled device 604 to lift open from the valve seat 674. After opening the controlled device 604, the controller may provide current in the first direction to rotate the gear 670 such that the shaft 608 moves in the direction of arrow 646 to close the controlled device 604. In this way, the opening and closing of the controlled device 604 can be regulated as per the requirement.

The description below describes the fail-safe operation of the fail-safe actuating system 600 for moving the controlled device 604 to a fail-safe position in case of a power failure or an emergency. With reference to FIGS. 6(a), 6(b) and 6(c), the fail-safe position of the controlled device 604 is the fully closed position. For the description of the fail-safe operation with reference to FIG. 6(c), let us assume the controlled device 604 is in the fully open position, and is to be moved to the fully closed position (fail-safe position).

As the power supply is cut-off due to a power failure or any emergency, the power to the actuator 602 is stopped and the locking device 626 is set in the OFF-state. In the OFF-state, the locking device 626 unlocks the extension element 652 and the actuator housing 606 from the locked state. The unlocking of the actuator housing 606 allows the spring 620 to unbias or release. The unbiasing or releasing of the spring 620 forces the actuator housing 606 to move back in the direction of arrow 646 (see FIG. 6(c)). This movement of the actuator housing 606 allows the engaging unit 630 to engage the actuator housing 606 with the shaft 608 such that the shaft 608 is also moved in the direction of arrow 646. This movement of the shaft 608 in the direction of arrow 646 moves the controlled device 604 to the fully closed position (fail-safe position).

Further, during the fail-safe operation, in the actuator 602, the housing and the stator of the motor (prime mover), coupled to the actuator housing 606, move together with the actuator housing 606. In an implementation, where the actuator 602, particularly the motor (prime mover), has a detent torque, the rotor of the motor does not rotate with respect to the stator in the absence of power. This causes the output of the motor, the gear 670, and hence the output element 608, to move back together with the actuator housing 606 in the direction of arrow 646. This movement of the output element 608 causes the controlled device 604 to move to the fully closed position (fail-safe position).

Further, in an implementation where the actuator 602 has a gear train (not shown) as a speed reducing unit, the gear train may be a non-reversible type gear train which may include a worm-screw arrangement, a nut-screw arrangement, or any other type of conventional non-reversible arrangement. As described earlier, this type of gear train may force the gear 670, and hence the output element 608, to move together with the actuator housing 606 during fail-safe operation, for moving the controlled device 604 to the fail-safe position.

Figure 7:
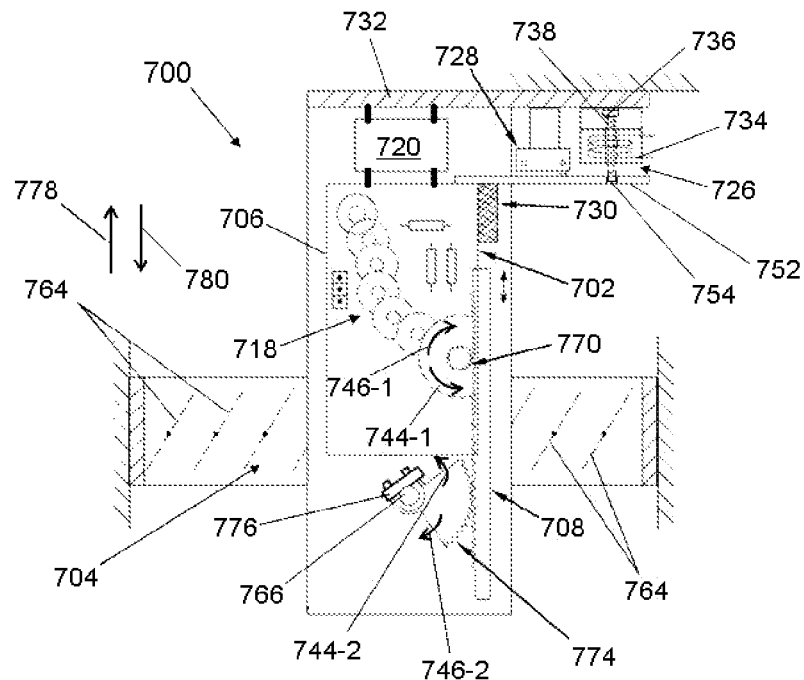
FIG. 7 illustrates a fail-safe actuating system, according to another embodiment of the present subject matter.

FIG. 7 illustrates a fail-safe actuating system 700, according to another embodiment of the present subject matter. The fail-safe actuating system 700 is configured to actuate a controlled device 704 (damper-type), as shown. FIG. 7 shows the fail-safe actuating system 700 in an intermediate position, in which the controlled device 704 is in partially open position and the biasing element 720 is in substantially biased state. The fail-safe actuating system 700 includes an actuator 702 with an actuator housing 706 and an output element 708. The output element 708 is a rack, as shown. For the purpose of description hereinafter, the output element 708 may be referred to as a rack 708.

In an implementation, the actuator 702 is an electrical actuator having a motor as the prime mover (not shown). The motor has a rotor and a stator, where the rotor is fixedly coupled to the output of the motor and the stator is fixedly coupled to the housing of the motor. The housing of the motor is fixedly coupled to the actuator housing 706. The output of the motor is coupled to a gear train 718 having a plurality of gears as shown, which functions as a speed reducing unit. The output of the gear train 718 is coupled to the rack 708 through a pinion gear 770. The rack 708 is toothed and is meshed with the pinion gear 770, such that the rotation of the pinion gear 770 causes the rack 708 to move axially.

The controlled device 704 includes more than one damper 764 that are rotated through a main damper shaft 766. The rack 708 is coupled to the main damper shaft 766 of the controlled device 704 through a coupler unit, such that the main damper shaft 766 and the dampers 764 of the controlled device 704 move in conjunction with the rack 708. As shown, the coupler unit includes a sector gear 774 and a clamp 776. The rack 708 is meshed with the sector gear 774, the sector gear 774 is fixedly coupled to the clamp 776, and the clamp 776 clamps the main damper shaft 766, as shown in FIG. 7. In an implementation, the sector gear 774 is a 90° sector gear.

The biasing element 720 in the fail-safe actuating system 700 may be a compression spring. For the purposes of description hereinafter, the biasing element 720 may be referred to as a spring 720. The spring 720, at one end, is coupled to the actuator housing 706 and, at the other end, is coupled to a rigid support 732.

The fail-safe actuating system 700 also includes a controller (not shown in FIG. 7), through which the actuator 702 is coupled to a power supply (not shown in FIG. 7). As mentioned earlier, the controller is configured to operate the actuator 702 in a first operating mode, in which the rack 708 is stationary and the actuator housing 706 is moved with respect to the rack 708 for biasing the spring 720; and in the second operating mode, in which the actuator housing 706 is stationary and the rack 708 is moved for operating the controlled device 720 for positioning the dampers 764.

The fail-safe actuating system 700 also includes a locking device 726 and a limit switch 728. The locking device 726 and the limit switch 728, in FIG. 7, are similar to the ones shown in FIG. 2. The locking device 726 is an electromagnetic locking device having a solenoid 734 and a plunger 736 with a plunger spring 738. The locking device 726 is coupled to the power supply, may be through the controller, for setting the locking device 726 in the ON-state or the OFF-state, as mentioned earlier. Further, the limit switch 728 is coupled to the controller to indicate the controller for switching the mode of operation of the actuator 702, as mentioned earlier. The aforementioned couplings in the fail-safe actuating system 700 are similar to the ones shown in FIG. 1 and, thus, are not shown in FIG. 7 for the sake of simplicity.

Further, an extension element 752, such as an arm or a plate, is coupled to the actuator housing 706, such that the extension element 752 is moved in conjunction with the actuator housing 706. The extension element 752 is provided with a slot 754, such that, in the ON-state of the locking device 726, the plunger 736 gets fit in the slot 754 to lock the actuator housing 706.

Further, the fail-safe actuating system 700 includes an engaging unit 730 that is configured to engage the actuator housing 706 with the rack 708, such that the rack 708 moves together with the actuator housing 706 during the fail-safe operation. In an implementation, the engaging unit 730 may be a block, as shown in FIG. 7, fixedly coupled to the actuator housing 706.

It may be noted that the dampers 764 are movable by 90° between the fully closed position and the fully open position. From the fully closed position, the sector gear 774, the main damper shaft 766 and the dampers 764 are not further movable in the direction of arrow 746-2. From the fully open position, the sector gear 774, the main damper shaft 766 and the dampers 764 are not further movable in the direction of arrow 744-2.

The description below describes the operation of the fail-safe actuating system 700 and the components of the fail-safe actuating system 700 for biasing the spring 720 and for operating the controlled device 704. With reference to FIG. 7, the controller first operates the actuator 702 in the first operating mode, in which the rack 708 is stationary and the actuator housing 706 is moved with respect to the rack 708 to bias the spring 720. For this, the controller provides current in a first direction, from the power supply to the actuator 702, such that the pinion gear 770 is rotated in the direction of arrow 746-1. This forces the rack 708 to move in the direction of arrow 780, which further forces the sector gear 774 and the main damper shaft 766 to move in the direction of arrow 746-2. Since the dampers 764 are blocked to move in the direction of arrow 746-2 from the fully closed position, the main damper shaft 766 and the sector gear 774 are not moved in the direction of arrow 746-2. As a result, the rack 708 is also not moved in the direction of arrow 780. In return, the rotating pinion gear 770 moves in the direction of arrow 778, over the rack 708. This movement of the pinion gear 770 moves the actuator housing 706 in the direction of arrow 778. This movement of the actuator housing 706 in the direction of arrow 778 biases the spring 720.

With the movement of the actuator housing 706, the extension element 752 also moves in the direction of arrow 778. At a position of the extension element 752, as shown in FIG. 7, the plunger 736 of the locking device 726 fits in the slot 754 to lock the actuator housing 706 for holding the spring 720 in the biased state. It may be understood that, as the power supply is in the active state, the locking device 726 is in the ON-state and, due to the electromagnetic interaction between the solenoid 734 and the plunger 736, as described earlier, the plunger 736 is pushed out of the locking device 726 to fit in the slot 754 of the extension element 752 and the plunger spring 738 is compressed. The locked, state of the actuator housing 706 is shown in FIG. 7.

Further, at the locked state, the extension element 752 mechanically, electrically, magnetically, optically or inductively couples with the limit switch 728. Upon this coupling of the extension element 752 with the limit switch 728, the limit switch 728 indicates the controller for the switching of the operation mode of the actuator 702.

After biasing the spring 720 and locking the actuator housing 706 for holding the spring 720 in the biased state, the controller operates the actuator 702 in the second operating mode, in which the actuator housing 706 is locked and, hence, is stationary, and the rack 708 is moved for moving and positioning the dampers 764. For opening the dampers 764 from the fully closed position, the controller may first provide current in a second direction (opposite to the first direction), from the power supply to the actuator 702, such that the pinion gear 770 is rotated in the direction of arrow 744-1. This movement of the pinion gear 770 causes the rack 708 to move in the direction of arrow 778. This movement of the rack 708 further causes the sector gear 774 and the main damper shaft 766 to move in the direction of arrow 744-2, which opens the dampers 764, as shown in FIG. 7. After the dampers 764 are open, the controller may provide current in the first direction to move the pinion gear 770 in the direction of arrow 746-1, and hence move the rack 708, the sector gear 774 and the main damper shaft 766 to close the dampers 764. In this way, the opening and closing of the dampers 764 of the controlled device 704 can be regulated in a range 0° to 90° as per the requirement.

The description below describes the fail-safe operation of the fail-safe actuating system 700 for moving the dampers 764 to a fail-safe position in case of a power failure or an emergency. With reference to FIG. 7, the fail-safe position of the dampers 764 is the fully closed position. For the description of the fail-safe operation with reference to FIG. 7, let us assume the dampers 764 are in the fully open position, and are to be moved to the fully closed position (fail-safe position).

As the power supply is cut-off due to a power failure or any emergency, the power to the actuator 702 is stopped and the locking device 726 is set in the OFF-state. In the OFF-state, the locking device 726 unlocks the extension element 752 and the actuator housing 706 from the locked state. The unlocking of the actuator housing 706 allows the spring 720 to unbias or release. The unbiasing or releasing of the spring 720 forces the actuator housing 706 to move back in the direction of arrow 780. This movement of the actuator housing 706 allows the engaging unit 730 to engage the actuator housing 706 with the rack 708 such that the rack 708 is also moved in the direction of arrow 780. This movement of the rack 708 causes the sector gear 774 and the main damper shaft 766 to move in the direction of arrow 746-2, which moves the dampers 764 to the fully closed position (fail-safe position).

Further, during the fail-safe operation, in the actuator 702, the housing and the stator of the motor (prime mover), coupled to the actuator housing 706, move together with the actuator housing 706. In an implementation, where the actuator 702, particularly the motor (prime mover), has a detent torque, the rotor of the motor does not rotate with respect to the stator in the absence of power. This causes the output of the motor, and hence the pinion gear 770 to move back together with the actuator housing 706 in the direction of arrow 780. This movement of the pinion gear 770 causes the rack 708 to move in the direction of arrow 780, which causes the sector gear 774 and the main damper shaft 766 to move in the direction of arrow 746-2. As results, the dampers 764 are moved to the fully closed position (fail-safe position).

Further, in an implementation, the gear train 718 may be a non-reversible type gear train which may include a worm-screw, arrangement, a nut-screw arrangement, or any other type of conventional non-reversible arrangement. As described earlier, this type of gear train 718 may force the pinion gear 770 to move together with the actuator housing 706 in the direction of arrow 780 during fail-safe operation. This movement of the pinion gear 770 causes the rack 708 to move in the direction of arrow 780, which causes the sector gear 774 and the main damper shaft 766 to move in the direction of arrow 746-2. As results, the dampers 764 are moved to the fully closed position (fail-safe position).

Figure 8:
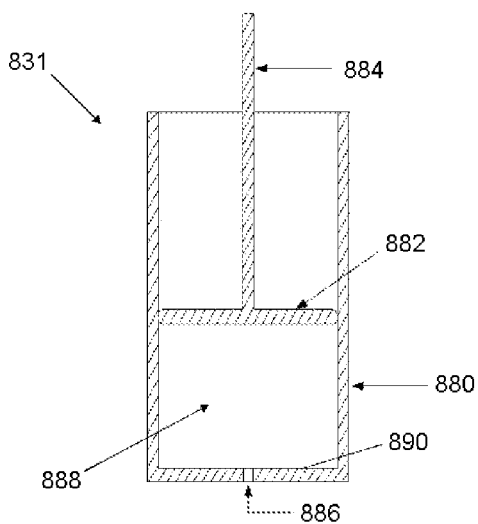
FIG. 8 illustrates a braking unit of the fail-safe actuating system, according to an embodiment of the present subject matter.

FIG. 8 illustrates a braking unit 831 of the fail-safe actuating system, according to an embodiment of the present subject matter. The braking unit 831 is an example of the braking unit 131 coupled to the actuator housing 106 in the fail-safe actuating system 100. Although not shown in FIGS. 2, 5, 6 and 7, the fail-safe actuating systems 200, 500, 600, 700 may include the braking unit 831 for controlling the speed of movement of the actuator housing 206, 506, 606, 706 and the output element 208, 508, 608, 708, and hence the speed of movement of the controlled device 204, 504, 604, 704, during the fail-safe operation.

In an implementation, as shown in FIG. 8, the braking unit 831 includes a cylinder 880 with one end open and the other end closed. A piston 882 with a connecting rod 884 is inserted in the cylinder 882 from the open end. The piston 882 is movable and is substantially air-tight in the cylinder 882. The cylinder 880 has a hole or orifice 886 at the closed end of the cylinder 880, as shown in FIG. 8. The orifice 886 is substantially small that allows air to pass to and from a chamber 888 formed by the piston 882 in the cylinder 880.

In an implementation, one end of the connecting rod 884 is coupled to the actuator housing of the actuator, such that, when the actuator housing moves in the first predefined direction to bias the biasing element the piston 882 is pulled out from the cylinder 880, and when the actuator housing is moved by the biasing element during the fail-safe operation the piston 882 is pushed inside the cylinder 880. In an implementation, the braking unit 831 is configured such that, at the end of the fail-safe operation, the piston 882 is fully inside the cylinder 880 and substantially touching the base 890 of the cylinder 880. During the operation of the actuator in the first operating mode, as the actuator housing is moved to bias the biasing element, the piston 882 is moved out from the cylinder 880. As the movement of the actuator housing is relatively slow, air is able to pass through the orifice 886 into the chamber 888. During the operation of the actuator in the second operating mode, the piston 882 is not moved. During the fail-safe operation, the biasing element is released and the actuator housing is moved back. With this, the piston 882 is pushed inside the cylinder 880. At the start of the fail-safe operation, the speed of movement of the actuator housing, and hence the piston 882, is relatively high, and the amount of air displaced in the cylinder 880 by the piston 882 is more than the amount of air that is able to escape from the cylinder 880 through the orifice 886. Thus, as the piston 882 is pushed inside the cylinder 880, the air pressure in the chamber 888 increases, which offers resistance to the further movement of the piston 882 in the cylinder 880. Due to this resistance offered by the air pressure, the speed of movement of the piston 882, and hence the actuator housing, is slowed. With this, the speed of movement of engaging unit, output element, coupler unit, and the controlled device, is decreased. At the end of the fail-safe operation, all the air passes out from the chamber 888 and the piston 882 is held stationary, which allows the biasing element to hold the actuator housing at the first predefined position and the controlled device to the fail-safe position.

In another implementation, one end of the connecting rod 884 may be coupled to the actuator housing of the actuator, such that when the actuator housing moves in the first predefined direction to bias the biasing element the piston 882 is pushed inside the cylinder 880, and when the actuator housing is moved by the biasing element during the fail-safe operation the piston 882 is pulled out from the cylinder 880. During the operation of the actuator in the first operating mode, as the actuator housing is moved to bias the biasing element, the piston 882 is pushed inside the cylinder 880. As the movement of the actuator housing is relatively slow, air is able to escape from the chamber 888 through the orifice 886. In an implementation, the braking unit 831 is configured such that, at the end of the operation of the actuator in the first operating mode, the piston 882 is fully inside the cylinder 880 and substantially touching the base 890 of the cylinder 880. During the operation of the actuator in the second operating mode, the piston 882 is not moved. During the fail-safe operation, the biasing element is released and the actuator housing is moved back. With this, the piston 882 is pulled out from the cylinder 880. At the start of the fail-safe operation, the speed of movement of the actuator housing, and hence the piston 882, is relatively high, and the rate at which the air is able to enter in the cylinder 880 through the orifice 886 is slow. Thus, as the piston 882 is pulled out from the cylinder 880, a vacuum gets created in the chamber 888, which offers resistance to the further movement of the piston 882 out from the cylinder 880. Due to this resistance offered by the vacuum in the chamber 888, the speed of movement of the piston 882, and hence the actuator housing, is slowed. With this, the speed of movement of engaging unit, output element, coupler unit, and the controlled device, is decreased. At the end of the fail-safe operation, the chamber 888 is fully filled with the air and the piston 882 is held stationary, which allows the biasing element to hold the actuator housing at the first predefined position and the controlled device to the fail-safe position.

The braking unit 831 described above has a substantially simple arrangement and is less costly in comparison to the braking assemblies used in conventional fail-safe actuating system. The braking unit 831 may be coupled to the actuator housing in any one of the configurations described above. Further, the braking unit 831 actively operates only during the fail-safe operation, offers substantially negligible resistance during the movement of the actuator housing to bias the biasing element and offers no resistance during the movement of the output element for positioning the controlled device. This facilitates in reducing the power consumption and wear and tear in the fail-safe actuating system, which makes the fail-safe actuating system of the present subject matter substantially more efficient than the conventional fail-safe actuating systems. Further, the braking unit 831 is an air-based braking unit which may work substantially efficiently in an emergency like fire.

Although embodiments for the fail-safe actuating systems have been described in language specific to structural features, it is to be understood that the invention is not necessarily limited to the specific features, described. Rather, the specific features are disclosed and explained in the context of a few embodiments for the fail-safe actuating systems.

Other advantages of the fail-safe actuating systems of the present subject matter will become better understood from the description and claims of an exemplary embodiment of the actuators. The fail-safe actuating system of the present subject matter is not restricted to the embodiments that are mentioned above in the description.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

I claim:

1. A fail-safe actuating system comprising:
   an actuator with an actuator housing and an output element, wherein the output element is couplable to a controlled device to move the controlled device in conjunction with the output element;
   a biasing element coupled to the actuator housing, wherein the biasing element is biased by a movement of the actuator housing in a first predefined direction;
   a locking device to lock the actuator housing for holding the biasing element in a biased state; and
   a controller configured to:
      operate the actuator in a first operating mode, wherein in the first operating mode, the output element is stationary and the actuator housing moves with respect to the output element and in the first predefined direction for biasing the biasing element; and
      operate the actuator in a second operating mode, wherein in the second operating mode, the actuator housing is stationary and the output element moves with respect to the actuator housing for moving the controlled device.

2. The fail-safe actuating system as claimed in claim 1, wherein in the first operating mode, the actuator housing moves till the actuator housing is locked by the locking device.

3. The fail-safe actuating system as claimed in claim 1, wherein the actuator is coupled to a power supply through the controller, wherein in the first operating mode, the controller provides current in a first direction from the power supply to the actuator to move the actuator housing with respect to the output element and in the first predefined direction from a first predefined position to a second predefined position.

4. The fail-safe actuating system as claimed in claim 3, wherein in the second operating mode, the controller provides current in one of a second direction and the first direction from the power supply to the actuator to move the output element with respect to the actuator housing for moving the controlled device.

5. The fail-safe actuating system as claimed in claim 3 further comprising a limit switch coupled to the controller, wherein at the second predefined position of the actuator housing, the limit switch indicates to the controller for switching operation of the actuator from the first operating mode to the second operating mode.

6. The fail-safe actuating system as claimed in claim 5, wherein the actuator housing, at the second predefined position, couples with the limit switch.

7. The fail-safe actuating system as claimed in claim 3, wherein the locking device is in an ON-state in an active state of the power supply, and wherein, in the ON-state, the locking device locks the actuator housing at the second predefined position.

8. The fail-safe actuating system as claimed in claim 7, wherein the locking device is coupled to the power supply.

9. The fail-safe actuating system as claimed in claim 7, wherein the locking device is coupled to the power supply through the controller, wherein the controller sets the locking device in the ON-state in the active state of the power supply, and wherein the controller sets the locking device in the OFF-state in the cut-off state of the power supply.

10. The fail-safe actuating system as claimed in claim 3, wherein the locking device is in an OFF-state in a cut-off state of the power supply, and wherein, in the OFF-state, the locking device unlocks the actuator housing from the second predefined state.

11. The fail-safe actuating system as claimed in claim 10, wherein, in the cut-off state of the power supply,
the biasing element is released to move the actuator housing in a direction opposite to the first predefined direction; and
the output element moves together with the actuator housing for moving the controlled device to a predefined fail-safe position.

12. The fail-safe actuating system as claimed in claim 11 further comprising an engaging unit, wherein in the cut-off state of the power supply, the engaging unit engages the actuator housing with the output element for moving the output element together with the actuator housing.

13. The fail-safe actuating system as claimed in claim 11, wherein the actuator includes a prime mover having a housing coupled to the actuator housing and having an output coupled to the output element, wherein the prime mover has a detent torque in the cut-off state of the power supply and wherein, in the cut-off state of the power supply, the output element moves together with the actuator housing due to the detent torque of the prime mover.

14. The fail-safe actuating system as claimed in claim 11, wherein the actuator includes a prime mover having a housing coupled to the actuator housing and having an output coupled to the output element through a non-reversible speed reducing unit, and wherein, in the cut-off state of the power supply, the output element moves together with the actuator housing due to the non-reversible speed reducing unit.

15. The fail-safe actuating system as claimed in claim 11, wherein the output element of the actuator is coupled to the controlled device through a coupler unit, wherein, in the cut-off state of the power supply, the coupler unit moves together with the output element for moving the controlled device to the predefined fail-safe position.

16. The fail-safe actuating system as claimed in claim 10 further comprising a braking unit coupled to the actuator housing, wherein the braking unit controls speed of movement of the actuator housing in the cut-off state of the power supply.

17. The fail-safe actuating system as claimed in claim 16, wherein the braking unit comprises:
a cylinder with an open end and a closed end, wherein the cylinder has an orifice in the closed end for allowing air to pass to and from the cylinder; and
a piston with a connecting rod inserted from the open end in the cylinder, wherein the connecting rod is coupled to the actuator housing.

18. The fail-safe actuating system as claimed in claim 10, wherein the locking device is coupled to the power supply through the controller, wherein the controller sets the locking device in the ON-state in the active state of the power supply, and wherein the controller sets the locking device in the OFF-state in the cut-off state of the power supply.

19. The fail-safe actuating system as claimed in claim 1, wherein the biasing element is one of a coil spring, a torsion spring, an expansion spring, a compression spring, a gas spring and an elastic element.

20. A fail-safe actuating system comprising:
a controlled device;
an actuator housing;
an actuator enclosed by the actuator housing;
a shaft, of the actuator, coupled to the controlled device so that when the shaft moves the controlled device moves in conjunction with the shaft;
a spring coupled to the actuator housing, wherein the spring is biased by a movement of the actuator housing in a first predefined direction;
a locking device configured to lock the actuator housing for holding the spring in a biased state; and
a controller configured to:
operate the actuator in a first operating mode, wherein in the first operating mode, the shaft is stationary and the actuator housing moves with respect to the shaft in the first predefined direction for biasing the spring, and
operate the actuator in a second operating mode, wherein in the second operating mode, the actuator housing is stationary and the shaft moves with respect to the actuator housing for moving the controlled device.

* * * * *